(12) United States Patent
Garlati

(10) Patent No.: US 11,151,262 B2
(45) Date of Patent: Oct. 19, 2021

(54) CONFIGURING, ENFORCING, AND MONITORING SEPARATION OF TRUSTED EXECUTION ENVIRONMENTS

(71) Applicant: Hex Five Security, Inc., Redwood City, CA (US)

(72) Inventor: Cesare Garlati, Redwood CIty, CA (US)

(73) Assignee: Hex Five Security, Inc., Redwood City, CA (US)

(*) Notice: Subject to any disclaimer, the term of this patent is extended or adjusted under 35 U.S.C. 154(b) by 303 days.

(21) Appl. No.: 16/450,826

(22) Filed: Jun. 24, 2019

(65) Prior Publication Data

US 2019/0392156 A1    Dec. 26, 2019

Related U.S. Application Data

(60) Provisional application No. 62/689,205, filed on Jun. 24, 2018, provisional application No. 62/796,967, filed on Jan. 25, 2019, provisional application No. 62/796,991, filed on Jan. 25, 2019, provisional application No. 62/801,091, filed on Feb. 5, 2019.

(51) Int. Cl.
| | |
|---|---|
| *G06F 21/60* | (2013.01) |
| *G06F 12/02* | (2006.01) |
| *G06F 1/3293* | (2019.01) |
| *H04L 9/32* | (2006.01) |
| *G06F 8/61* | (2018.01) |

(52) U.S. Cl.
CPC ......... *G06F 21/602* (2013.01); *G06F 1/3293* (2013.01); *G06F 8/61* (2013.01); *G06F 12/0223* (2013.01); *H04L 9/3247* (2013.01); *G06F 2212/7202* (2013.01)

(58) Field of Classification Search
None
See application file for complete search history.

(56) References Cited

U.S. PATENT DOCUMENTS

| | | | |
|---|---|---|---|
| 5,280,614 A | 1/1994 | Munroe | |
| 5,987,557 A | 11/1999 | Ebrahim | |
| 7,882,317 B2 | 2/2011 | Hunt | |
| 7,882,318 B2* | 2/2011 | Savagaonkar | .......... G06F 21/79 |
| | | | 711/163 |
| 8,745,745 B2 | 6/2014 | Mooring | |
| 8,996,864 B2 | 3/2015 | Maigne | |
| 9,767,320 B2* | 9/2017 | Sharp | ...................... G06F 21/10 |
| 10,140,049 B2 | 11/2018 | Schubert | |

(Continued)

FOREIGN PATENT DOCUMENTS

WO    WO2016164424 A1    10/2016

*Primary Examiner* — Christopher C Harris
(74) *Attorney, Agent, or Firm* — David R. Stevens; Stevens Law Group

(57) ABSTRACT

The present invention extends to methods, systems, and computer program products for configuring, enforcing, and monitoring separation of trusted execution environments. Firmware images consistent with configuration of multiple separate execution domains can be generated without requiring changes to existing application source code. A cryptographically signed firmware image can be loaded at a processor to form multiple separate execution domains at the processor. Communications can be secured across separate execution domains without using shared memory.

15 Claims, 11 Drawing Sheets

(56) References Cited

U.S. PATENT DOCUMENTS

| | | |
|---|---|---|
| 2004/0143720 A1* | 7/2004 | Mansell .............. G06F 12/1491 |
| | | 711/206 |
| 2005/0071840 A1 | 3/2005 | Neiger |
| 2006/0136694 A1* | 6/2006 | Hasbun ................ G06F 12/145 |
| | | 711/173 |
| 2007/0050764 A1 | 3/2007 | Traut |
| 2007/0220276 A1* | 9/2007 | Croxford ................ G06F 21/74 |
| | | 713/193 |
| 2010/0328064 A1 | 12/2010 | Rogel |
| 2011/0131402 A1 | 6/2011 | Mittal |
| 2011/0167422 A1 | 7/2011 | Eom |
| 2012/0216242 A1 | 8/2012 | Uner |
| 2013/0031374 A1 | 1/2013 | Thom |
| 2014/0282050 A1 | 9/2014 | Quinn |
| 2015/0227462 A1* | 8/2015 | Grocutt ................... G06F 12/06 |
| | | 711/147 |
| 2016/0026790 A1 | 1/2016 | Cohn |
| 2018/0173516 A1* | 6/2018 | Tung ......................... G06F 8/63 |
| 2019/0004973 A1* | 1/2019 | Chhabra ................ H04L 63/061 |
| 2021/0073403 A1* | 3/2021 | Swaine ................... G06F 21/57 |

* cited by examiner

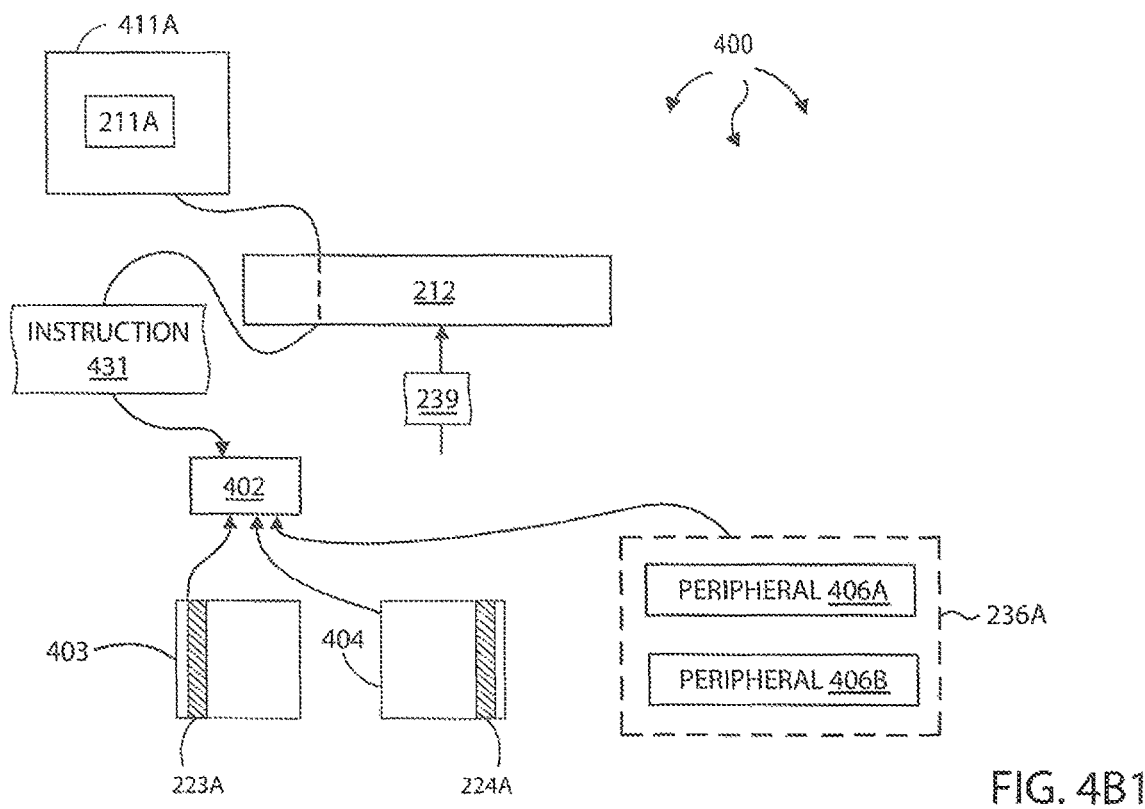
FIG. 4B1
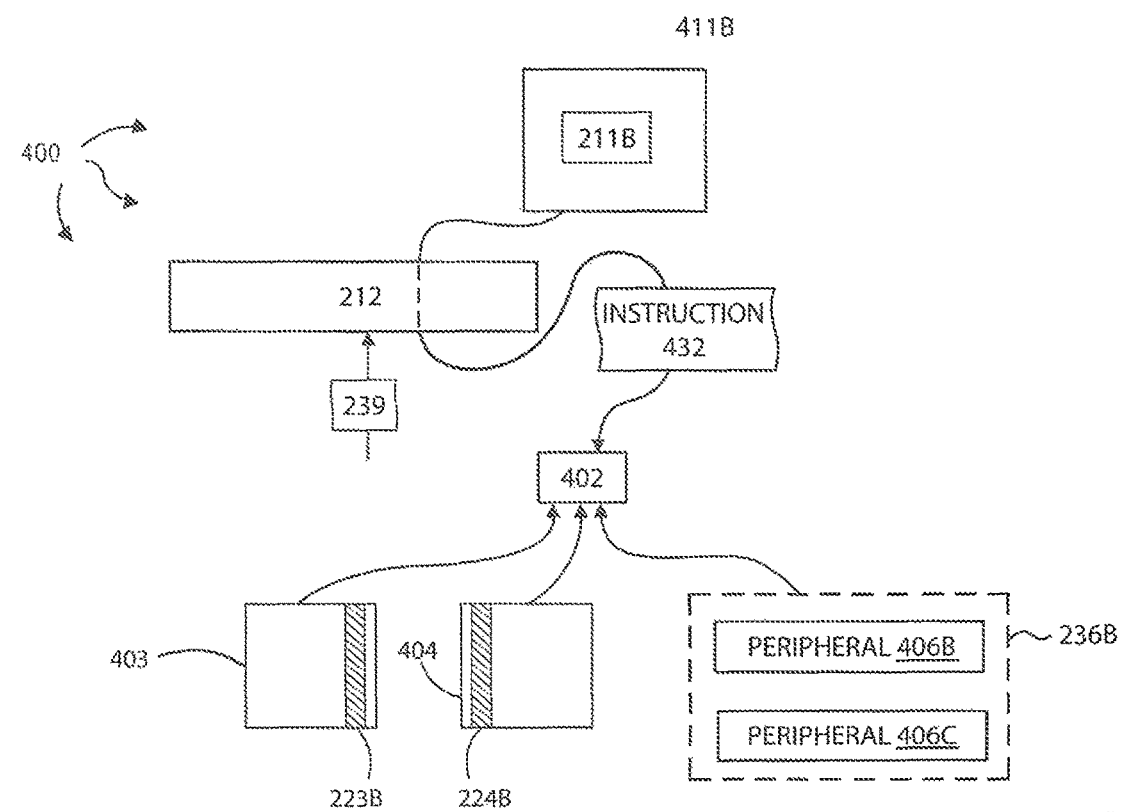
FIG. 4B2

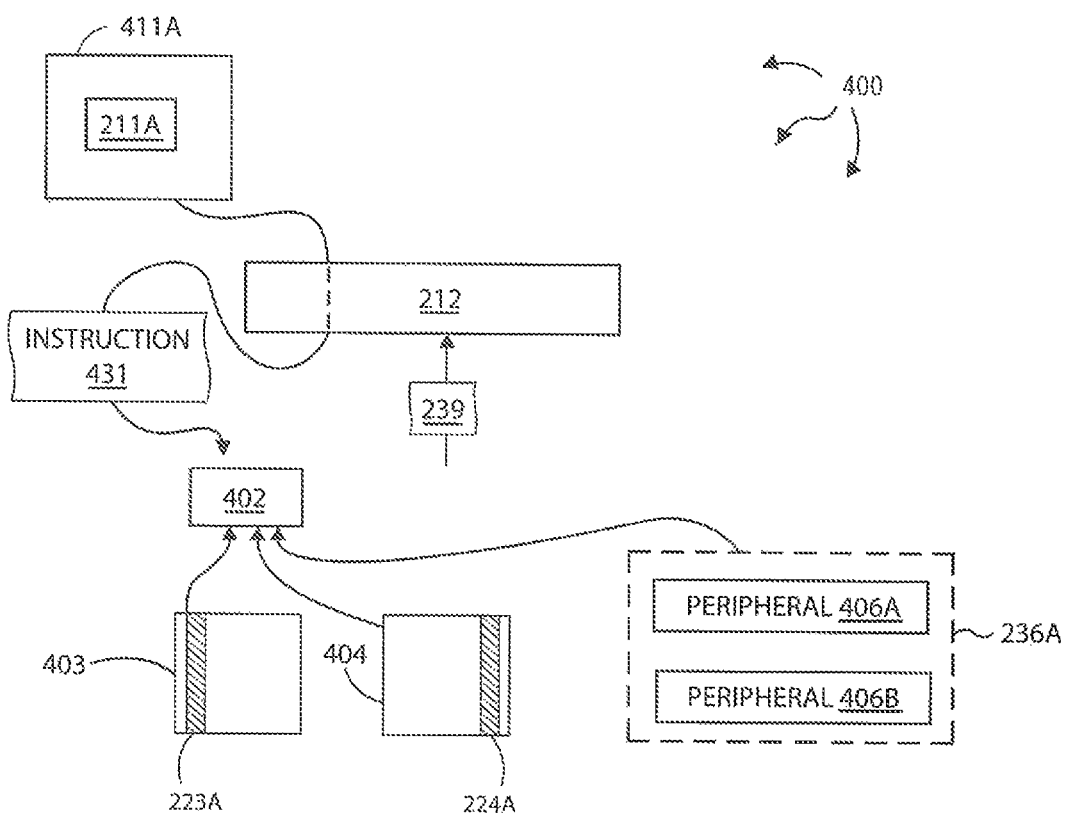
FIG. 4B3

```
 3    Tick = 10 # ms  ~~ clock interval 621                          600
 4
 5    Zone = 1 # ~~611A
 6     622 ~~ irq  = 16, 17, 18 # BTN0 BTN1 BTN2
 7    612A ~~ base = 0x20410000; size =       64K; rwx = rx # FLASH
 8    613A ~~ base = 0x80001000; size =       16K; rwx = rw # RAM
 9    614A ~~ base = 0x10025000; size =     0x100; rwx = rw # PWM
10    616A ~~ base = 0x10012000; size =     0x100; rwx = rw # GPIO
11    617A ~~ base = 0x0C000000; size =  0x400000; rwx = rw # PLIC
12
13    Zone = 2 # ~~611B
14    612B ~~ base = 0x20420000; size =      256K; rwx = rx # FLASH
15    613B ~~ base = 0x80005000; size =       32K; rwx = rw # RAM
16    614B ~~ base = 0x60000000; size =        8K; rwx = rw # XEMACLITE
17
18    Zone = 3 # ~~611C
19    612C ~~ base = 0x20460000; size =       64K; rwx = rx # FLASH
20    613C ~~ base = 0x8000D000; size =        8K; rwx = rw # RAM
21
22    Zone = 4 # ~~611D
23    612D ~~ base = 0x20470000; size =       64K; rwx = rx # FLASH
24    613D ~~ base = 0x8000F000; size =        4K; rwx = rw # RAM
25    614D ~~ base = 0x10013000; size =     0x100; rwx = rw # UART
```

FIG. 6

```
include <unistd.h>                                          900 ifndef LIBHEXFIVE_H_
define LIBHEXFIVE_H_ void ECALL_YIELD();      }~901
void ECALL_WFI();

int ECALL_SEND(int, void *);    }~902
int ECALL_RECV(int, void *);

void ECALL_TRP_VECT(int, void *);
void ECALL_IRQ_VECT(int, void *);
                                        }~903
void ECALL_CSRS_MIE();
void ECALL_CSRC_MIE();

void ECALL_CSRW_MTIMECMP(uint64_t);   }~904 uint64_t ECALL_CSRR_MTIME();
uint64_t ECALL_CSRR_MCYCLE();
uint64_t ECALL_CSRR_MINSTR();
uint64_t ECALL_CSRR_MHPMC3();
uint64_t ECALL_CSRR_MHPMC4();
                                        }~905
uint64_t ECALL_CSRR_MISA();
uint64_t ECALL_CSRR_MVENDID();
uint64_t ECALL_CSRR_MARCHID();
uint64_t ECALL_CSRR_MIMPID();
uint64_t ECALL_CSRR_MHARTID();

#endif
```

FIG. 9

CONFIGURING, ENFORCING, AND MONITORING SEPARATION OF TRUSTED EXECUTION ENVIRONMENTS

CROSS-REFERENCE TO RELATED APPLICATIONS

This application claims the benefit of and priority to U.S. Provisional Patent Application Ser. No. 62/689,205, entitled "Methods and system for securing multiple execution domains in RISC-V processors" by Cesare Garlati, the entire contents of which are expressly incorporated by reference. This application claims the benefit of and priority to U.S. Provisional Patent Application Ser. No. 62/796,967, entitled "Methods and system for securing multiple execution domains in ARM processors" by Cesare Garlati et al., the entire contents of which are expressly incorporated by reference. This application claims the benefit of and priority to U.S. Provisional Patent Application Ser. No. 62/796,991, entitled "Methods and system for securing multiple execution domains in MIPS processors" by Cesare Garlati et al., the entire contents of which are expressly incorporated by reference. This application claims the benefit of and priority to U.S. Provisional Patent Application Ser. No. 62/801,091, entitled "Methods and system for securing multiple execution domains in extended instruction set processors" by Cesare Garlati et al., the entire contents of which are expressly incorporated by reference.

BACKGROUND

1. Field of the Invention

This invention relates generally to configuring computer systems, and, more particularly, to configuring, enforcing, and monitoring separation of trusted execution environments.

2. Related Art

Many current computer system environments, including RISC-V, Arm, and MIPS systems, lack separation between data, code, and peripherals belonging to different software applications. As such, these computer systems are inherently insecure. For example, RISC-V processors provide a memory management unit (MMU) and virtual memory functionality. However, even these mechanisms are not sufficiently secure. MMU functionality is typically controlled by a rich operating system (e.g., Linux) that is too complex to be assumed free from defects. At least one platform does provide physical resource separation via specialized hardware, for example, separate CPU and memory. Such an arrangement is somewhat more secure but provides limited (e.g., only 2) execution modes, such as, for example, secure and not secure. Thus, even these arrangements do not meet safety and security requirements for many (e.g., modern) applications.

BRIEF DESCRIPTION OF THE DRAWINGS

The specific features, aspects and advantages of the present invention will become better understood with regard to the following description and accompanying drawings where:

FIGS. 4B1-4B3 illustrates the example computer architecture of FIG. 4A that facilitates concurrently executing a plurality of executables in the multi-domain execution environment.

FIG. 6 illustrates can example configuration file defining execution domains.

FIG. 9 illustrates an example API definition.

DETAILED DESCRIPTION

Figure 1:
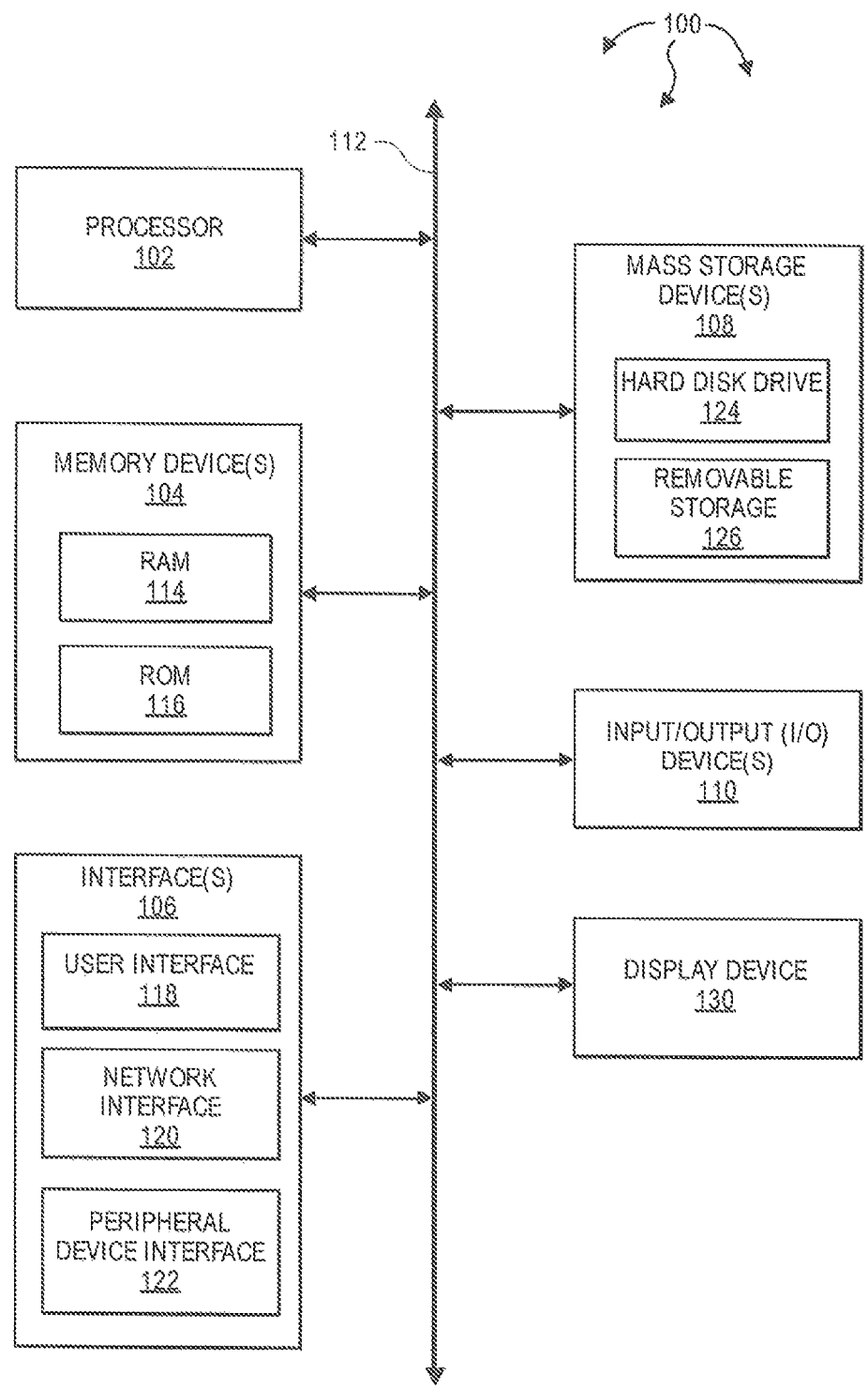
FIG. 1 illustrates a simplified example block diagram of a generic computing device.

The present invention extends to methods, systems, and computer program products for configuring, enforcing, and monitoring separation of execution environments, including data, programs, and peripherals access. In general, firmware images consistent with configuration of multiple separate execution domains can be generated without requiring changes to existing application source code. Further, communications can be secured across separate execution domains without using shared memory.

Accordingly, aspects of the invention provide dynamic hardware-enforced separation of data, programs, and peripherals to an essentially unlimited number of execution domains. Separation can be implemented without a memory management unit (MMU), virtual memory functionality, or a rich operating system (although separation can work with these and other components when present). Multiple execution domains can be concurrently executed without requiring dedicated hardware components for safety and security.

In some aspects, RISC-V physical memory protection (PMP) is leveraged with at least two levels of privileged execution. In other aspects, ARM processor or MIPS processor memory protection techniques, such as Memory Protection Units (MPU), are leveraged with at least two level of privileged execution. In one aspect, a verifiable software layer (e.g., a secure monitor) executes at a higher (possibly highest) privilege level (e.g. M-mode). The verifiable software layer dynamically switches processor state to enforce separation and security policies for execution domains that run at lower privilege levels (e.g., either U-mode or S-mode).

In another aspect, the verifiable software layer provides message-based mechanisms (e.g., group 902 in API definition 900) to allow inter-domain communication between execution domains without utilizing memory-shared data structures such as buffers. In a further aspect, the verifiable software layer provides a proprietary software API implementation (e.g., a system call, executable code, a library, etc.) facilitating secure execution of selected higher privilege instructions from a lower privilege mode (e.g., group 905 in API definition 900). The proprietary software API can leverage features of a trusted executed environment to trap and emulate a higher privilege mode instruction in a lower privilege mode by each individual execution domain without compromising the processor security model. The proprietary software API can implement an open source API definition (e.g., defined in a PDF, Word, or power point file). In one aspect, the open source API definition is provided in the form of a C header file.

In general, a configuration system can configure physical memory protection (PMP) ranges, read/write/execute policies, and runtime behavior, including instruction fencing, for essentially an unlimited number of separate execution domains. The configuration system can include a user interface, such as, for example, a graphical user interface (GUI), a command line interface, Integrated Development Environment (IDE) plug-ins, or e.g., (HyperText Markup Language (HMTL)-based) web browser interface. Through the user interface, a user can enter configuration defining multiple separated execution environments, including configuration settings, creating configuration files, etc.

The configuration system can generate a cryptographically signed firmware image consistent with the defined multiple separated execution environments without changing existing application source code. The firmware image can be verified and loaded at a (e.g., embedded) processor to initialize the processor consistent with the defined multiple separated execution environments. Authenticity and integrity of the firmware can be verified using cryptography techniques, including hashing, digests and digital signature authentication (DSA).

At runtime, the processor can concurrently execute multiple applications, each application running in its own security context (domain) without the need for additional operating system software. A bare-metal microkernel-based preemptive scheduler can switch between security contexts (e.g., ECALL_YIELD( ) in group 901 in API definition 900) at specified (e.g., regular) intervals and prevent a faulty execution domain from comprising other execution domains. Switching between security contexts can include switching physical memory protection context and security policies of each individual execution domain. Switching can occur without a memory management unit and without virtual memory or rich operating system functionality. However, aspects can seamlessly interoperate with a memory management unit, virtual memory or rich operating system functionality if present.

Real-time interrupts and software traps can be handled consistent with configuration of multiple separated execution domains (e.g., group 903 in API definition 900). To facilitate system safety and execution domain separation, interrupt requests can be serviced at a lower privilege mode consistent with execution domain configurations. Higher privileged instructions can be transparently caught and emulated in lower privilege modes consistent with configuration of the multiple separated execution domains.

Load, store, and execute access faults can be handled without disrupting other computing activities. Access faults can be configured to: (1) be ignored, in which case the program counter skips the faulty instruction, (2) raise an internal message directed to other execution domains, or (3) force restart of the faulty execution domain.

In one aspect, PMP ranges includes a mix of top of range (TOR), naturally aligned power-of-two (NAPOT), and 4-Byte addresses optimized for granularity and context switch speed of each separate (and secure) execution domain. User mode registers and PMP configuration registers can be used to dynamically activate and enforce physical memory protection ranges and access policies of an execution environment in scope.

Embodiments of the present invention may comprise or utilize a special purpose or general-purpose computer including computer hardware, such as, for example, one or more processors and system memory, as discussed in greater detail below. More specifically, aspects of the invention can be designed for and implemented on embedded systems. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, embedded systems, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Modules and data described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In general, aspects of the invention can be implemented using any of a variety of instruction set architectures (ISAs) including but not limited to: RISC-V, Arm, and MIPS.

Within this description and the following claims, a "zone" is functionally equivalent to an "execution domain".

Figure 2:
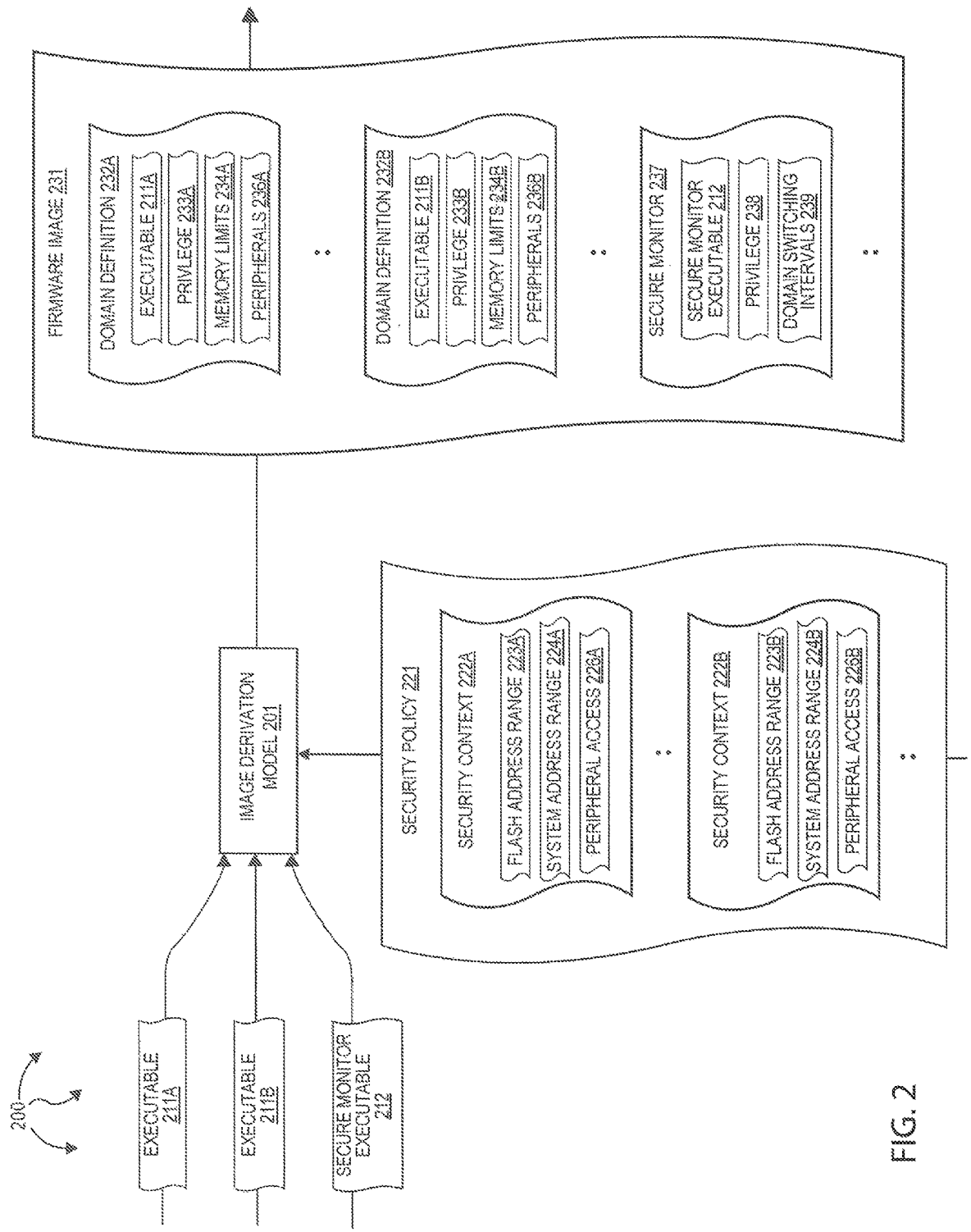
FIG. 2 illustrates an example computer architecture that facilitates generating a firmware image defining a plurality of separated execution domains.

FIG. 2 illustrates an example computer architecture 200 that facilitates generating a firmware image defining a plurality of separated execution domains. Referring to FIG. 2, computer architecture 200 includes image derivation module 201. Image derivation module 201 as well as other components can be connected to one another over (or be part of) a network, such as, for example, a PAN, a LAN, a WAN, and even the Internet. Accordingly, image derivation module 201 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Image derivation module 201 is configured to access one or more executables, a secure monitor executable, and a security policy. The security policy can define data, flash memory ranges, system memory ranges, and peripherals that are to be accessible to each of the one or more executables. Defined flash memory ranges and system memory ranges can be non-overlapping per executable. Image derivation module 201 can automatically select a more (or most) appropriate PMP configuration out of many options available on a target platform (TOR/NAPOT/4B) to maximize the number of PMP regions (memory mapped resources per zone). For example, image derivation module 201 can determine when TOR is better than NAPOT, etc.

Image derivation module 201 can derive an image file from the one or more executables, a secure monitor executable, and a security policy. The image file can define one or more execution domains corresponding to the one or more executables. Each execution domain can be defined to execute at a specified privilege level (lower than a secure execution monitor) and use a corresponding non-overlapping flash memory range and a non-overlapping system memory range. Since memory ranges are non-overlapping, it is highly unlikely (if not virtually impossible) for an executable executing in one execution domain to impact another executable executing in another execution domain. Each execution domain can be configured to use one or more memory-mapped peripheral devices. Memory ranges and peripheral device usage can be defined in view of resource configuration at a computer system (e.g., an embedded system) where the image file is to be installed. A peripheral can be shared between execution domains, with different execution domains using the peripheral when execution focus is transitioned (switched) to that domain in accordance with specified switching intervals.

The number of PMP registers inherent in a processor may be limited (e.g., hardcoded to a specified number, such as, 8). However, image derivation module 201 can also configure an image file so that the policy stored in a processor on-demand at runtime is intelligently changed within a domain context (not just when switching between domains). Changing policy within a domain context at runtime can be utilized to exceed a processor limited number of registers per execution domain.

Image derivation module 201 can also perform a number of cross-checks and validations to avoid operator errors, such as, for example, a policy that allows an execution domain to overlap the text and data regions of the secure monitor.

Image derivation module 201 can also configure an image file such that multiple software timers (soft-timers) are created when the image file is loaded and executed. Each soft-timer can work the same as a processor built-in hardware timer. Each execution domain can be allocated its own soft-timer (e.g., group 904 in API definition 900). Having multiple timers allows multiple operating systems (OS) to run in parallel on the same physical processor. The multiple timers are provided without the need for additional hardware or software components therefor minimizing attack surface and maximizing security.

The image file can also define a secure monitor configuration corresponding to a target platform (e.g., in accordance with an architecture parameter). The secure monitor runs at a higher privilege level relative to any other execution domains. The secure monitor can also define preemptive domain switching time intervals. Preemptive domain switching can force the transition between execution domains in case execution context is not regularly released (e.g., ECALL_YIELD( ) in group 901 in API definition 900), for example, if the security of an execution context is compromised.

Figure 3:
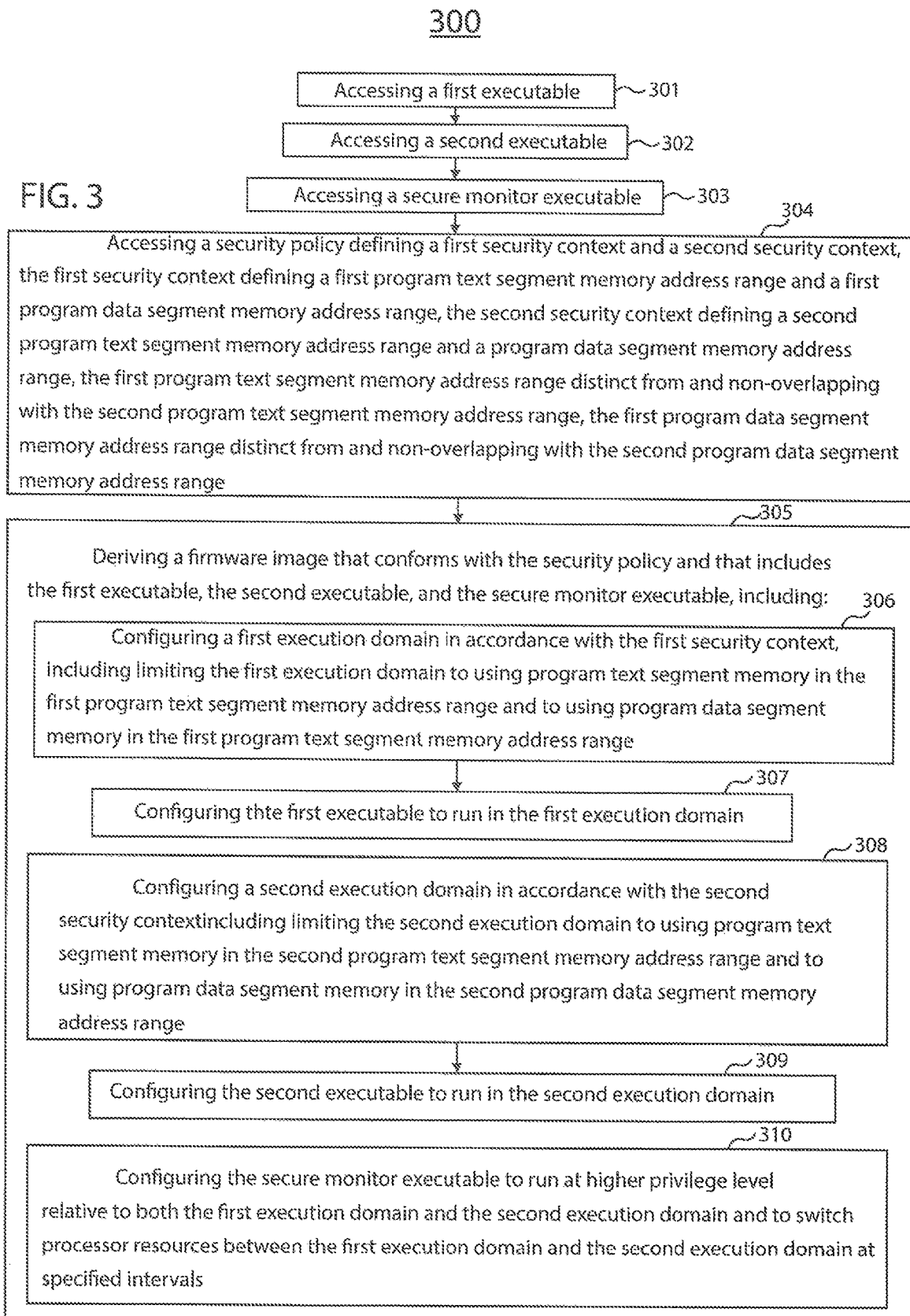
FIG. 3 illustrates a flow chart of an example method for generating a firmware image defining a plurality of separated execution domains.

FIG. 3 illustrates a flow chart of an example method 300 for generating a firmware image defining a plurality of separated execution domains. Method 300 will be described with respect to the components and data depicted in computer architecture 200.

Method 300 includes accessing a first executable (301). For example, image derivation module 201 can access executable 211A. Method 300 includes accessing a second executable (302). For example, image derivation module 201 can access executable 211B. Method 300 includes accessing a secure monitor executable (303). For example, image derivation module 201 can access secure monitor executable 212. When appropriate, image derivation module 201 can also access one or more additional executables (e.g., a third executable, a fourth executable, etc.)

Method 300 includes accessing a security policy defining a first security context and a second security context, the first security context defining a first program text segment memory (or "first program memory") address range and a first program data segment memory (or "first data memory") address range, the second security context defining a second program text segment memory (or "second program memory") address range and a second program data segment (or "second data memory") memory address range, the first program text segment memory address range distinct from and non-overlapping with the second program text segment memory address range, the first program data segment memory address range distinct from and non-overlapping with the second program data segment memory address range (304). For example, image derivation module 201 can access security policy 221. As depicted, security policy 221 defines security context 222A, security context 222B, etc.

Program text segment memory or program memory can include any of: flash, ROM, or RAM technologies. Program data segment memory or data memory can include any of: RAM or DDR technologies.

Security context 222A defines flash address range 223A, system address range 224A, and peripheral access 226A. Flash address range 223A can correspond to a range of flash memory at a computer system where a firmware image is to be installed. Similarly, system address range 224A can correspond to a range of system memory at the computer system where the firmware image is to be installed. Peripheral access 226A can correspond to (e.g., memory mapped) peripherals at the (e.g., embedded) computer system where the firmware image is to be installed.

Security context 222B defines flash address range 223B, system address range 224B, and peripheral access 226B. Flash address range 223B can correspond to another range of flash memory at a computer system where a firmware image is to be installed. Similarly, system address range 224B can correspond to another range of system memory at the computer system where the firmware image is to be installed. Peripheral access 226B can correspond to (e.g., memory based) peripherals at the (e.g., embedded) computer system where the firmware image is to be installed.

Flash address range 223A can be distinct from and non-overlapping with flash address 223B can be non-overlapping. Similarly, system address range 224A can be distinct from and non-overlapping with system address 224B.

When appropriate, security policy 221 can define one or more additional contexts (e.g., a third security context, a fourth security context, etc.). Each of the one or more additional contexts can define a corresponding flash memory address range, a system memory address range, and peripheral access. The additional flash memory address ranges can be distinct from and non-overlapping with one another as well as non-overlapping with the first flash memory address range and the second flash memory address range. The additional system memory address ranges can be distinct from and non-overlapping with one another as well as non-overlapping with the first system memory address range and the second system memory address range. Peripheral access defined for additional security contexts can correspond to (e.g., memory mapped) peripherals at the (e.g., embedded) computer system where the firmware image is to be installed.

Each additional security context and correspond to one of the one or more additional executables. For example, the third security context can correspond to the third executable, the fourth security context can correspond to the fourth executable, etc. respectively.

Method 300 includes deriving a firmware image that conforms with the security policy and that includes the first executable, the second executable, and the secure monitor executable (305). For example, image derivation module 201 can derive firmware image 231 to conform with security policy 221. Image derivation module 201 can cryptographically sign the firmware image 231. As depicted, firmware image 231 includes executable 211A, executable 211B, and secure monitor executable 212. When appropriate firmware image can also include the one or more additional executables (e.g., the third executable, the fourth executable, etc.).

Deriving a firmware image includes configuring a first execution domain in accordance with the first security context, including limiting the first execution domain to using program text segment memory in the first program text segment memory address range and to using program data segment memory in the first program data segment memory address range (306). Deriving a firmware image includes configuring the first executable to run in the first execution domain (307). For example, deriving firmware image 231 can include deriving domain definition 232A and configuring executable 211A to run in an execution domain formed from domain definition 232A. Domain definition 232A defines the execution domain for executable 221A in accordance with security context 222A. Domain definition 232A defines that executable 211A is to execute with a privilege level corresponding to privilege 233A, is limited to using memory within memory limits 234A, and is limited to using peripherals 236A. Image derivation module 201 can derive memory limits 234A from flash address range 223A and system address range 224A. Image derivation module can derive peripherals 236A from peripheral access 226A.

Deriving a firmware image includes configuring a second execution domain in accordance with the second security context, including limiting the second execution domain to using program text segment memory in the second program text segment memory address range and to using program data segment memory in the second program data segment memory address range (308). Deriving a firmware image includes configuring the second executable to run in the second execution domain (309). For example, deriving firmware image 231 can include deriving domain definition 232B and configuring executable 211B to run in an execution domain formed from domain definition 232B. Domain definition 232B defines the execution domain for executable 221B in accordance with security context 222B. Domain definition 232B defines that executable 211B is to execute with a privilege level corresponding to privilege 233B (which may be the same or different than the privilege level corresponding to privilege 233A), is limited to using memory within memory limits 234B, and is limited to using peripherals 236B. Image derivation module 201 can derive memory limits 234B from flash address range 223B and system address range 224B. Image derivation module can derive peripherals 236B peripheral access 226B.

When appropriate, deriving firmware image can include deriving a domain definition per additional executable (e.g., third, fourth, etc.) and configuring the additional executable to run in an execution domain formed from the domain definition. Each additional domain definition can be defined for an executable in accordance with a corresponding additional security context. For example, an additional domain definition can define that an additional executable is to execute with a specified privilege level. The specified privilege level may be the same or different than privilege levels corresponding to privilege 233A, 233B, or specified privileges corresponding to other additional executables.

Deriving a firmware image includes configuring the secure monitor executable to run at higher privilege level relative to both the first execution domain and the second execution domain and to switch processor resources between the first execution domain and the second execution domain at specified intervals (310). For example, image derivation module 201 can derive secure monitor 237. Secure monitor 237 defines that secure monitor executable 212 is to execute with a privilege level corresponding to privilege 238. The privilege level corresponding to privilege 238 can be higher than privilege levels corresponding privileges 233A and 223B respectively. Secure monitor 237 defines that a processor is to switch between execution domains defined in domain definitions 232A, 232B, etc. in accordance with domain switching intervals 239. Domain switching intervals 239 can define switching between execution domain at equal intervals or variable intervals.

When appropriate, image derivation module 201 can define that secure monitor executable 212 is to execute with a privilege 238 that is also higher than privilege levels associated with the one or more additional executables (e.g., third executable, fourth executable, etc.). Secure monitor 237 can also define that the processor is to switch between execution domains defined in domain definitions for the one more additional executables in accordance with domain switching intervals 239.

Figure 4A:
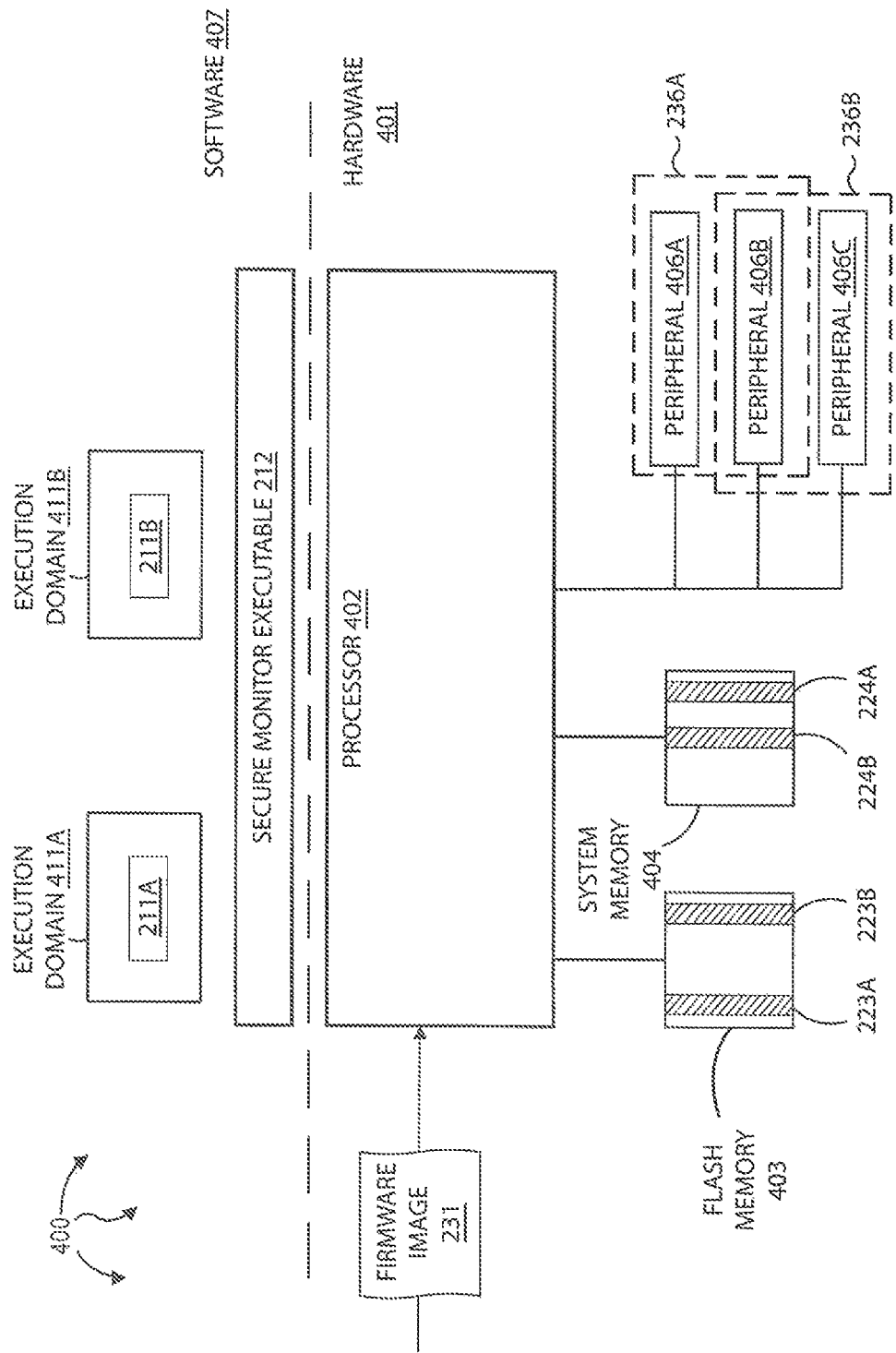
FIG. 4A illustrates an example computer architecture that facilitates forming and executing a multi-domain execution environment

Turning to FIG. 4A, FIG. 4A illustrates an example computer architecture 400 that facilitates forming and executing a multi-domain execution environment. As depicted, computer architecture 400 includes hardware 401 and software 407. Similar to computer architecture 200, hardware 401 and software 407, as well as other components (e.g., image derivation module 201) can be connected to one another over (or be part of) a network, such as, for example, a PAN, a LAN, a WAN, and even the Internet. Accordingly, hardware 401 and software 407 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Hardware 401 further includes processor 402, flash memory 403, system memory 404, and peripherals 406A-406C. Processor 402 can process image 231 to form execution domains 411A and 411B in software 407. Processor 402 can use the cryptographic methods to check integrity and authenticity of image 231 to prevent unwanted changes to policies 221 and/or to secure monitor executable 212. Processor 402 can load executable 211A in execution domain 411A and can load executable 211B in execution domain 411B.

In accordance with domain definition 232A, execution domain 411A is limited to using flash address range 223A in flash memory 403, using system address range 224A in system memory 404, and using peripherals 236A (including peripherals 406A and 406B). Similarly, in accordance with domain definition 232B, execution domain 411B is limited to using flash address range 223B in flash memory 403, using system address range 224B in system memory 404, and using peripherals 236B (including peripherals 406B and 406C).

When appropriate, processor 402 can load image 231 to form one or more additional execution domains (e.g., a third execution domain, a fourth execution domain, etc.) in software 407. Processor 402 can load additional corresponding executables (e.g., the third executable, the fourth executable, etc.) into each of the one or more additional execution domains. The one or more additional execution domains can be limited to using flash memory ranges, system memory ranges, and peripherals defined in corresponding domain definitions in firmware image 231.

Processor 402 can also load secure monitor executable 212 in software 407. In general, secure monitor executable 412 monitors and controls execution within execution domains 411A and 411B (and any other execution domains). Secure monitor executable 412 can also switch execution between different execution domains in accordance with domain switching intervals 239.

Figure 5:
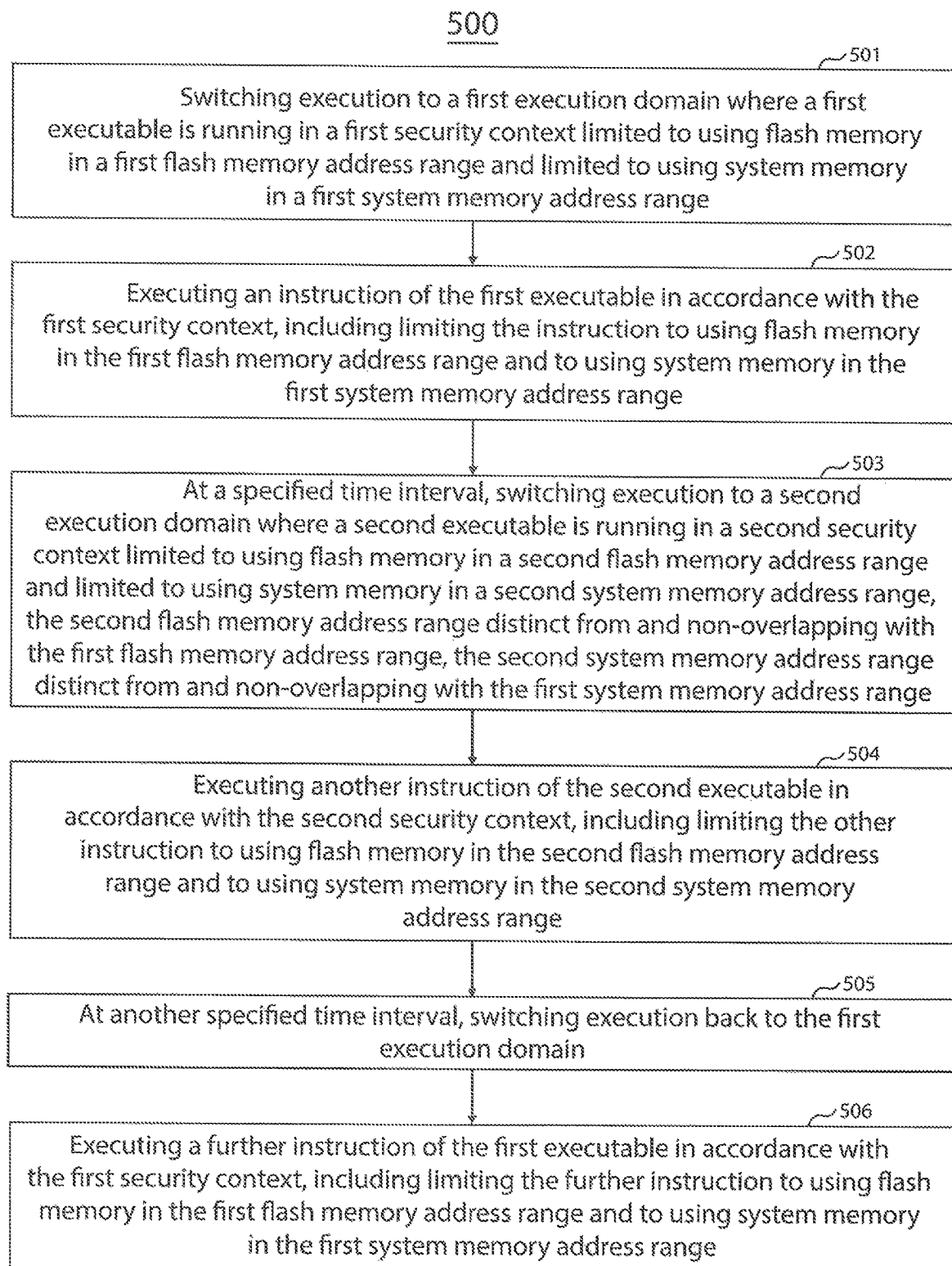
FIG. 5 illustrates a flow chart of an example method for concurrently executing a plurality of executables.

FIGS. 4B1-4B3 illustrate computer architecture 400 that facilitates concurrently executing a plurality of executables in the multi-domain execution environment. FIG. 5 illustrates a flow chart of an example method 500 for concurrently executing a plurality of executables. Method 500 will be described with respect to the components and data of computer architecture 400.

Method 500 includes switching execution to a first execution domain where a first executable is running in a first security context limited to using flash memory in a first flash memory address range and limited to using system memory in a first system memory address range (501). For example, in FIG. 4B1, in accordance with domain switching intervals 239, secure monitor executable 212 can switch execution to execution domain 411A. Executable 211A is running in execution domain 411A in accordance with a context (defined in domain definition 232A) limited to using flash address range 223A, system address range 224A, and peripherals 236A.

Method 500 includes executing an instruction of the first executable in accordance with the first security context, including limiting the instruction to using flash memory in the first flash memory address range and to using system memory in the first system memory address range (502). For example, processor 402 can execute instruction 431 from executable 211A. Secure monitor executable 212 can limit instruction 431 to using flash memory 403 in flash address range 223A, to using system memory 404 in system address range 224A, and to using peripherals 236A.

Method 500 includes at a specified time interval, switching execution to a second execution domain where a second executable is running in a second security context limited to using flash memory in a second flash memory address range and limited to using system memory in a second system memory address range, the second flash memory address range distinct from and non-overlapping with the first flash memory address range, the second system memory address range distinct from and non-overlapping with the first system memory address range (503). For example, in FIG. 4B2, in accordance with domain switching intervals 239, secure monitor executable 212 can switch execution to execution domain 411B. Executable 211B is running in execution domain 411B in accordance with a context (defined in domain definition 232B) limited to using flash address range 223B, system address range 224B, and peripherals 236B.

Method 500 includes executing another instruction of the second executable in accordance with the second security context, including limiting the other instruction to using flash memory in the second flash memory address range and to using system memory in the second system memory address range (504). For example, processor 402 can execute instruction 432 from executable 211A. Secure monitor executable can limit instruction 432 to using flash memory 403 in flash address range 223B, to using system memory 404 in system address range 224B, and to using peripherals 236B.

Method 500 includes at another specified time interval, switching execution back to the first execution domain (505). For example, in FIG. 4B3, in accordance with domain switching intervals 239, secure monitor executable 212 can switch execution back to execution domain 411A. Method 500 includes executing a further instruction of the first executable in accordance with the first security context, including limiting the further instruction to using flash memory in the first flash memory address range and to using system memory in the first system memory address range (506). For example, processor 402 can execute instruction 433 from executable 211A. Secure monitor executable 212 can limit instruction 433 to using flash memory 403 in flash address range 223A, to using system memory 404 in system address range 224A, and to using peripherals 236A.

Thus, execution domains 411A and 411B may share peripheral 406B. Domain 411A can use peripheral 406B when execution is switched to domain 411A in accordance with domain switching intervals 239. Domain 411B can use peripheral 406B when execution is switched to domain 411B in accordance with domain switching intervals 239.

When appropriate and at specified time intervals in accordance with switching intervals 239, secure monitor executable 212 can also switch execution to and/or between one or more additional execution domains (e.g., a third execution domain, a fourth execution domain, etc.). For example, secure monitor executable 212 can switch to and/or between one or more additional execution domains subsequent to executing an instruction of executable 211A and prior to executing an instruction of executable 211B. Similarly, secure monitor executable 212 can switch to and/or between (e.g., a different) one or more additional execution domains subsequent to executing an instruction of executable 211B and prior to executing an instruction of executable 211A. Processor 402 can execute instructions from executables (e.g., a third executable, a fourth executable, etc.) in each of the one or more additional domains. Secure monitor executable 212 can limit instructions from executables in the one or more execution domains to using defined flash address ranges, system memory address ranges, and peripherals.

Execution domains 211A and 211B can be selectively suspended or transitioned to a low power mode to conserve power (e.g., ECALL_WFI( ) in group 901 in API definition 900). If/when execution domains 211A and 211B are both suspended, processor 402 can be transitioned into a low power state via the privileged instruction "waiting for interrupts" (WFI) instruction in RISC-V or similar in other architectures—i.e. Arm and MIPS. Processor 402 can be resumed upon external interrupts.

As described, configuration for one or more execution domains can be defined in a configuration file. Defining configuration for an execution domain can include defining: memory ranges (e.g., flash and/or RAM), memory range access policies, memory mapped peripherals, interrupt latency, fence instruction activation, etc. Memory range access policies can indicate any combination of: Read, Write, Execute, or no access. Memory peripherals can include: Universal Asynchronous Receiver Transmitters (UARTs), Pulse-width modulators (PWMs), Pulse-duration modulators (PDMs), Real-time Clocks (RTCs), General-purpose input/output (GPIO) devices, Platform Level Interrupt Controllers (PLICs), Ethernet ports (XEMACLITE), Push Buttons (BTNs), etc.

FIG. 6 illustrates an example configuration file 600 defining execution domains 611A, 611B, 611C, 611D.

Clock interval 621 defines a 10 ms preemptive scheduler interval.

Configuration parameters 622, 612A, 613A, 614A, 616A, and 617A define configuration for execution domain 611A. Configuration parameter 622 defines Push Buttons 0, 1, and 2 tied to Interrupt Requests (IRQs) 16, 17, and 18 respectively for execution domain. In general, an IRQ is a signal sent to a processor that temporarily stops a running program and allows a special program, an interrupt handler, to run instead. Interrupts are used to handle events, such as receiving data from a modem or network card, key presses, button presses, mouse movements, etc.

Configuration parameter 612A defines that execution domain 611A is to have access to 64K (Kilobytes) of flash memory. The base address of the 64K flash memory is 0x20410000 and execution domain 611A has Read access and Execute access to the 64K flash memory. The 64K Flash memory can be used to store the text segment of an executable to be run in execution domain 611A. Instructions 613A define that execution domain 611A is to have access to 16K (Kilobytes) of Random Access Memory (RAM). The base address of the 16K RAM is 0x80000400 and execution domain 611A has Read access and Write access to the 16K RAM.

Configuration parameter 614A defines a 256-byte long range for the PWM peripheral (0x represents hexadecimal, 0x100 converts to 256 in decimal base). The base address of the PWM is 0x10025000 and execution domain 611A has Read access and Write access to the PWM. Configuration parameter 616A defines a 256-byte long range for the GPIO device. The base address of the GPIO device is 0x1001200 and execution domain 611A has Read access and Write access to the GPIO device. Configuration parameter 617A defines a 4 MB range PLIC. The base address of the PLIC is 0x0C000000 and execution domain 611A has Read access and Write access to the PLIC.

Configuration parameters 612B, 613B, and 614B define configuration for execution domain 611B. Configuration parameter 612B defines that execution domain 611B is to have access to 256K (Kilobytes) of flash memory. The base address of the 256K flash memory is 0x20420000 and execution domain 611B has Read access and Execute access to the 256K flash memory. The 256K flash memory can be used to store a text segment of an executable to be run in execution domain 611B. Configuration parameter 613B defines that execution domain 611B is to have access to 32K (Kilobytes) of Random Access Memory (RAM). The base address of the 32K RAM is 0x80005000 and execution domain 611B has Read access and Write access to the 32K RAM. Configuration parameter 614B defines an 8K Ethernet port. The base address of the Ethernet port is 0x60000000 and execution domain 611B has Read access and Write access to the Ethernet port.

Configuration parameters 612C and 613C define configuration for execution domain 611C. Instruction 612C defines that execution domain 611C is to have access to 64K (Kilobytes) of flash memory. The base address of the 64K flash memory is 0x2046000 and execution domain 611B has Read access and Execute access to the 64K flash memory. The 64K flash memory can be used to store a text segment of an executable to be run in execution domain 611C. Configuration parameter 613C defines that execution domain 611C is to have access to 8K (Kilobytes) of Random Access Memory (RAM). The base address of the 8K RAM is 0x8000D000 and execution domain 611C has Read access and Write access to the 8K RAM.

Configuration parameters 612D, 613D, and 614D define configuration execution domain 611D. Configuration parameter 612D defines that execution domain 611D is to have access to 64K (Kilobytes) of flash memory. The base address of the 64K flash memory is 0x2047000 and execution domain 611C has Read access and Execute access to the 64K flash memory. The 64K flash memory can be used to store a text segment of an executable to be run in execution domain 611D. Configuration parameter 613D defines that execution domain 611D is to have access to 4K (Kilobytes) of Random Access Memory (RAM). The base address of the 4K RAM is 0x8000F000 and execution domain 611D has Read access and Write access to the 4K RAM. Configuration parameter 6114D defines a 256-byte range UART. The base address of the UART is 0x1001300 and execution domain 611D has Read access and Write access to the UART.

A configuration can also define shared use of a memory mapped peripheral between execution domains. Each execution domain can use the memory mapped peripheral when execution focus is transitioned (switched) to the execution domain in accordance with specified switching intervals.

An image derivation module (e.g., 201) or a configurator (e.g., 700) can use configuration 600 to form an image defining multiple execution domains. The image can be loaded at a processor to configure the processor with the defined multiple execution domains.

Figure 7:
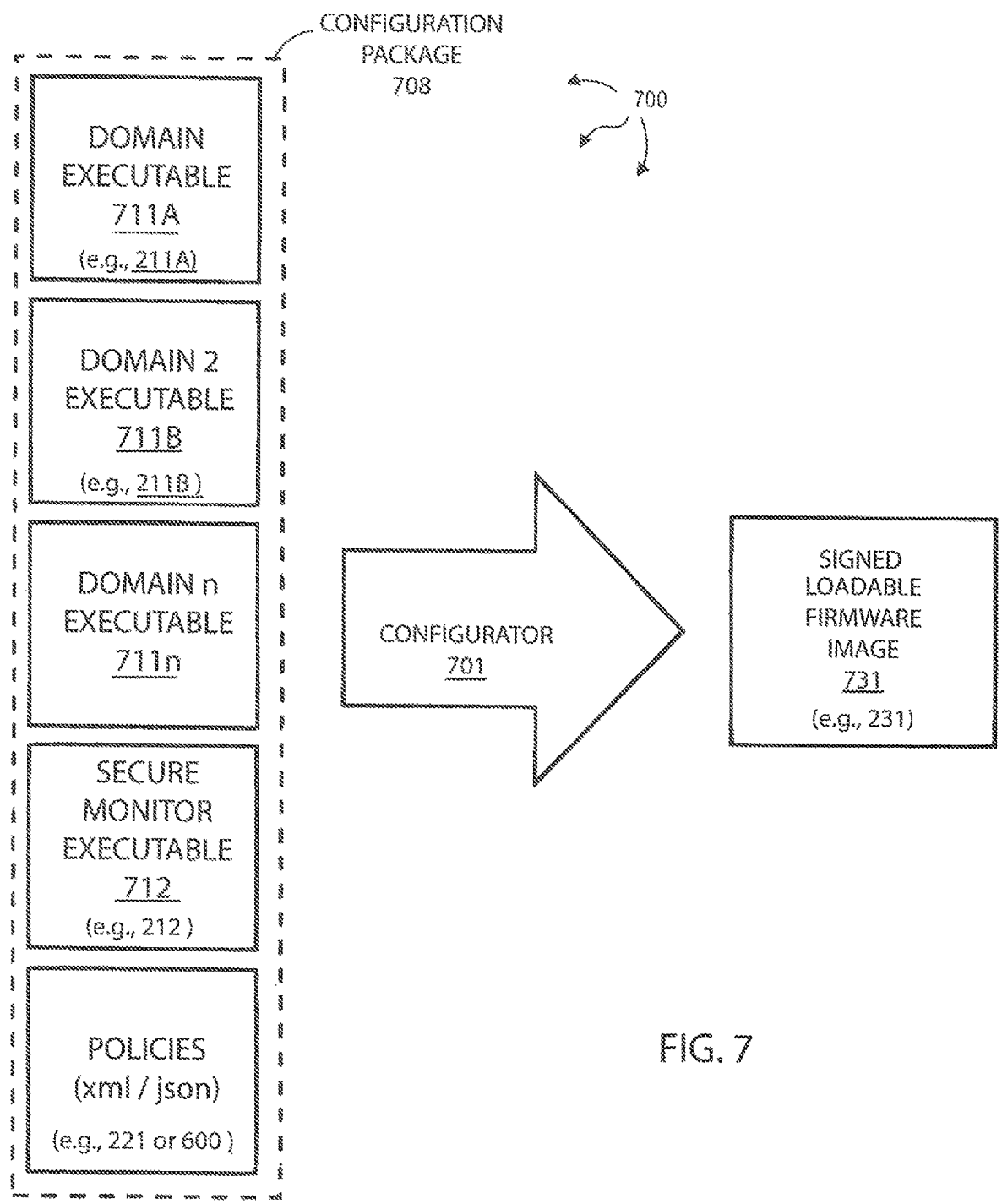
FIG. 7 illustrates a computer architecture that facilitates generating a cryptographically signed firmware image including a plurality of separated execution domains.

FIG. 7 illustrates a computer architecture 700 that facilitates generating a cryptographically signed firmware image including a plurality of separated execution domains. In general, configurator 701 creates signed loadable firmware image 731 from configuration package 708. Signed loadable firmware image 731 can be cryptographically signed.

As depicted, configuration package 708 includes domain executable 711A (e.g., 211A), domain executable 711B (e.g., 211B), . . . , domain executable 711n. Accordingly, there can be virtually any number of domain executables. Configuration package 708 can also include secure monitor executable 712 (e.g., 212) and policies 721 (e.g., 221 or 600). Policies 721 may be written in flat ascii text, eXtensible Markup Language (XML) or JavaScript Object Notation (JSON) formats.

Configurator 701 can refer to policies 721 to determine interrupt handling, fence instruction handling, memory access, and peripheral access for execution domains corresponding to each of domain executable 711A (e.g., 211A), domain executable 711B (e.g., 211B), . . . , and domain executable 711n. Configurator 701 can configure the execution domains in accordance with determined interrupt handling, fenced instruction handling, memory access, and peripheral access and indicate execution domain configurations in signed loadable firmware image 731. Configurator 701 can include secure monitor executable 712 in signed loadable firmware image 731 to enforce determined interrupt handling, fenced instruction handling, memory access, and peripheral access per execution domain.

Configurator 701 can automatically select a more (or most) appropriate PMP configuration out of many options available on a target platform (TOR/NAPOT/4B) to maximize the number of PMP regions (memory mapped resources per zone). Configurator 701 can perform one or more cross-checks and validations to avoid operator errors entered into configuration package 708, such as, a policy that allows one of 811A, 811B, . . . , 811n to overlap with multi domain secure monitor 712.

Configurator 701 can also configure signed loadable firmware image 731 so that policy loaded in processor 802 on-demand at runtime is intelligently changed internal within one or more of execution domains 811A, 811B, . . . , 811n to exceed (e.g., hard coded) PMP register limitations of processor 802. Configurator 701 can also configure signed loadable firmware image 731 such that each of execution domains 811A, 811B, . . . , 811n is allocated its own soft-timer.

Figure 8:
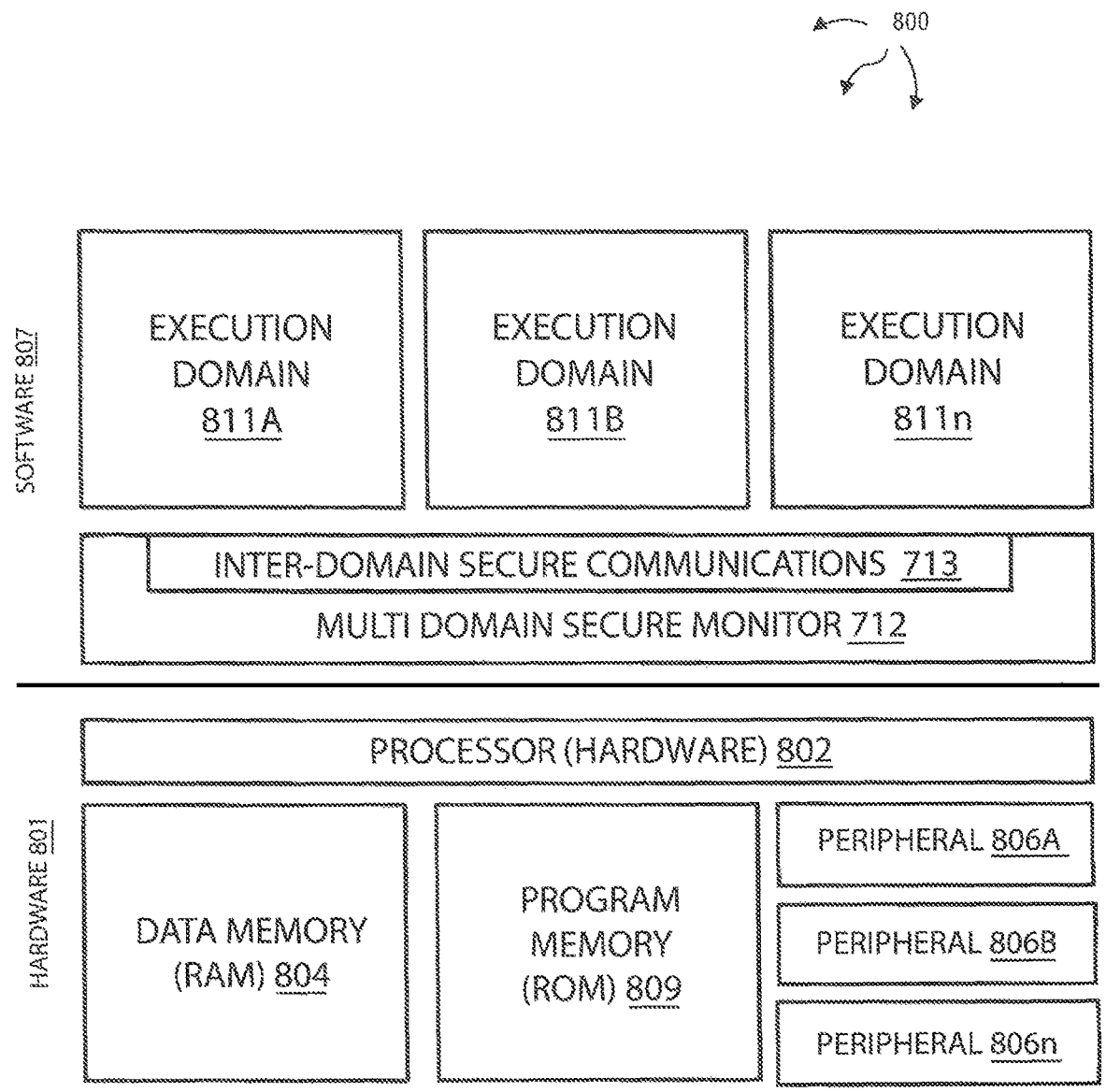
FIG. 8 illustrates a simplified example multi-domain execution environment.

FIG. 8 illustrates an example multi-domain execution environment 800. As depicted, hardware 801 includes processor 802, data memory 804, program memory 809, and peripherals 806A, 806B, . . . , 806n. Processor 802 can load signed loadable firmware image 731 to instantiate software 807. Processor 802 can use the cryptographic signature to check the integrity of signed loadable firmware image 731 to prevent unwanted changes to policies 721 and/or to secure monitor executable 712.

As depicted, software 807 includes execution domains 811A, 811B, . . . , 811n and multi domain secure monitor 712. Each execution domain can correspond to a domain executable included in configuration package 708. Execution domain 811A can correspond to domain executable 711A, execution domain 811B can correspond to domain executable 711B, . . . , execution domain 811n can correspond to domain executable 711n.

Multi domain secure monitor 713 enforces polices 721 against the execution domains 811A, 811B, . . . , 811n, such as, for example, limiting/controlling access to subsets (e.g., address ranges) of data memory 804, program memory 809, and peripherals 806A, 806B, . . . , 806n. Multi domain secure monitor 712 incudes inter-domain secure communications 713 (e.g., facilitated by group 902 in API definition 900). Inter-domain secure communications 713 can translate between the contexts of different execution domains to facilitate inter-domain communication.

Any of execution domains 811A, 811B, . . . , 811n can be selectively suspended or transitioned to a low power mode to conserve power (e.g., facilitated by ECALL_WFI( ) in group 901 in API definition 900). If/when all execution domains 811A, 811B, . . . , 811n are both suspended, processor 802 can be transitioned into a low power state. Processor 802 can be resumed upon external interrupts.

FIG. 9 illustrates an example API definition 900. API definition 900 can be implemented in any of variety of APIs to facilitate aspects of the invention. As depicted, API definition 900 defines a number of functions. Table 1 describes the functions, their syntax, and use examples.

TABLE 1

| Function | Syntax and Function | Example |
|---|---|---|
| ECALL_YIELD | void ECALL_YIELD( );<br>Indicates to a scheduler that the Zone has nothing pressing to do and causes the scheduler to immediately move to the next Zone in context. | ECALL_YIELD( );<br>In the case of a three zone implementation with a tick time of 10 ms, the maximum time to come back to context is 20 ms, faster if the other zones Yield as well. |
| ECALL_SEND | int ECALL_SEND([Zone #], [0-3][Int]);<br>Send transmits a message from the current zone to the [Zone #]; the message size is an array of [4] integers and the nanoKernel manages transmission with no shared memory. The value returned is 1 if the receiving mailbox is empty and transmission successful or 0 if the receiving mailbox is full and transmission was blocked. | int state = ECALL_SEND(1, {201, 0, 0 ,0});<br>Sends an array to Zone 1 of {201, 0, 0, 0}; state = 1 if successful transmission. |
| ECALL_RECV | int ECALL_RECV[Zone #], [0-3][int]);<br>Checks the mailbox of the current Zone for a message from the listed Zone #, if there is a new message the it returns 1, if no new message it returns 0. The value of the message is copied into the array structure provided. | int msg[4]={0,0,0,0};<br>int state = ECALL_RECV(1, msg);<br>If a new message exists in the mailbox from zone 1, state = 1 and it copies it to msg, otherwise state = 0. |

TABLE 1-continued

| Function | Syntax and Function | Example |
|---|---|---|
| ECALL_CSRS_MIE | void ECALL_CSRS_MIE( ); Secure user-mode emulation of the Machine Status Register (mstatus) MIE bit. Enables all interrupts (PLIC + CLINT) mapped to the zone including the soft timer (trap 0x3). The operation is atomic with respect to the context of the zone. | ECALL_CSRS_MIE( ); |
| ECALL_CSRS_MIE | void ECALL_CSRS_MIE( ); Secure user-mode emulation of the Machine Status Register (mstatus) MIE bit. Disables all interrupts (PLIC + CLINT) mapped to the zone including the soft timer (trap 0x3). The operation is atomic with respect to the context of the zone. | ECALL_CSRS_MIE( ); |
| ECALL_TRP_VEC | void ECALL_TRP_VECT([Exception Code], [Trap Handler]) Registers a handler against a trap generated by unauthorized instructions; the TRAP #s are defined in the RISC-V Privileged Architectures definition V1.1, Table 3.6 Interrupt 0 types. | ECALL_TRP_VECT(0x0, trap_0x0_handler); Where trap_0x0_handler is registered at the User level of privilege with: Void trap_0x0_handler(void)_at tribute_((interrupt("user "))); void trap_0x0_handler(void){ // Your handler code here } |
| ECALL_IRQ_VEC | void ECALL_IRQ_VECT([Interrupt #], [Trap Handler]) Registers a handler for an interrupt that has been assigned to a Zone in the multizone.cfg file. When an interrupt occurs, the scheduler can immediately pull the zone assigned to that interrupt into context and execute the registered interrupt handler. | ECALL_IRQ_VECT(11, button_0_handler); Where button_0_handler is a registered at the user level of privilege with: void button_1_handler(void)_at tribute_((interrupt("user "))); void button_1_handler(void){ //   interrupt handler here } |
| ECALL_CSRW_MTIMECMP | void ECALL_CSRW_MTIMECMP(uint64_t) Secure user-mode emulation of the machine-mode timer compare register (mtimecmp). Causes a trap 0x3 exception when the mtime register contains a value greater than or equal to the value assigned. Each zone has its own secure instance of timer and trap handler. Per RISC-V specs this is a one-shot timer: once set it will execute its callback function only once. Note that mtime and mtimecmp size is 64-bit even on rv32 architecture. Registering the trap 0x3 handler sets the value of mtimecmp to zero to prevent spurious interrupts. If the timer is set but no handler is registered the exception is ignored. | #include <libhexfive.h> . . . void trap_0x3_handler(void)_at tribute_((interrupt("user "))); void trap_0x3_handler(void){ // do something // restart the timer uint64_t T = 10; // ms uint64_t T0 = ECALL_CSRR_MTIME( ); uint64_t T1 = T0 + T*32768/1000; ECALL_CSRR_MTIMECMP(T1); } . . . main ( ) { ECALL_TRP_VECT(0x3, trap_0x3_handler); // register 0x3 Soft timer while(1){ // do many things } } |
| ECALL_CSRR_MTIME( ) | Int64 ECALL_CSRR_MTIME( ) Returns MTIME to a variable in a zone, MTIME is a privileged registered normally only available in M mode. | Int64 mtime = ECALL_CSRR_MTIME( ); |

TABLE 1-continued

| Function | Syntax and Function | Example |
|---|---|---|
| ECALL_CSRR_MCYCLE( ) | Int64 ECALL_CSRR_MCYCLE( ) Returns MCYCLE to a variable in a zone, MCYCLE is a privileged registered normally only available in M mode. | Int64 mcycle = ECALL_CSRR_MCYCLE( ); |
| ECALL_CSRR_MINSTR( ) | Int64 ECALL_CSRR_MINSTR( ) Returns MINSTR to a variable in a zone, MINSTR is a privileged register normally only available in M mode. | Int64 minstr = ECALL_CSRR_MINSTR( ); |
| ECALL_CSRR_MHPMC3( ) | Int64 ECALL_CSRR_MHPMC3( ) Returns MHPMC3 to a variable in a zone, MHPMC3 is a privileged register normally only available in M mode. | Int64 mhpmc3 = ECALL_CSRR_MHPMC3( ); |
| ECALL_CSRR_MHPMC4( ) | Int64 ECALL_CSRR_MHPMC4( ) Returns MHPMC4 to a variable in a zone, MHPMCA is a privileged register normally only available in M mode. | Int64 mhpmc4 = ECALL_CSRR_MHPMC4( ); |
| ECALL_CSRR_MISA( ) | Int64 ECALL_CSRR_MISA( ) Returns MISA to a variable in a zone, MISA is a privileged register normally only available in M mode. | Int64 misa = ECALL_CSRR_MISA( ); |
| ECALL_CSRR_MVENDID( ) | Int64 ECALL_CSRR_MVENDID( ) Returns MVENDID to a variable in a zone, MVENDID is a privileged register normally only available in M mode. | Int64 mvendid = ECALL_CSRR_MVENDID( ); |
| ECALL_CSRR_MARCHID( ) | Int64 ECALL_CSRR_MARCHID( ) Returns MARCHID to a variable in a zone, MARCHID is a privileged register normally only available in M mode. | Int64 marchid = ECALL_CSRR_MARCHID( ); |
| ECALL_CSRR_MIMPID( ) | Int64 ECALL_CSRR_MIMPID( ) Returns MIMPID to a variable in a zone, MIMPID is a privileged register normally only available in M mode. | Int64 mimpid = ECALL_CSRR_ MIMPID ( ); |
| ECALL_CSRR_MHARTID( ) | Int64 ECALL_CSRR_MHARTID( ) Returns MHARTID to a variable in a zone, MHARTID is a privileged register normally only available in M mode. | Int64 mhartid = ECALL_CSRR_ MHARTID ( ); |

Accordingly, aspects of the invention facilitate formation of an essentially unlimited number of separate execution domains without requiring MMU, Virtual Memory, an operating system, or other hardware means except physical memory protection units (PMP) and two distinct privileged modes.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for generating a firmware image including a plurality of separated execution domains, comprising:

accessing a first executable;
accessing a second executable;
accessing a secure monitor executable;
accessing a security policy defining a first security context and a second security context, the first security context defining a first flash memory address range and a first system memory address range, the second security context defining a second flash memory address range and a system memory address range, the first flash memory address range distinct from and non-overlapping with the second flash memory address range, the first system memory address range distinct from and non-overlapping with the second system memory address range; and
deriving the firmware image in accordance with the security policy and that includes the first executable, the second executable, and the secure monitor executable, including:
configuring a first execution domain in accordance with the first security context, including limiting the first execution domain to using flash memory in the first flash memory address range and to using system memory in the first system memory address range;
configuring the first executable to run in the first execution domain;

configuring a second execution domain in accordance with the second security context, including limiting the second execution domain to using flash memory in the second flash memory address range and to using system memory in the second system memory address range;

configuring the second executable to run in the second execution domain; and configuring the secure monitor executable to run at higher privilege level relative to both the first execution domain and the second execution domain and to switch processor resources between the first execution domain and the second execution domain at specified intervals.

2. The method of claim 1, further comprising:
installing the firmware image initializing a processor in accordance with the plurality of separated execution domains.

3. The method of claim 1, wherein deriving the firmware image in accordance with the security policy comprises deriving the firmware image to include hardware-enforced separation between the first execution domain and the second execution domain.

4. The method of claim 1, further comprising cryptographically signing the firmware image.

5. The method of claim 1, wherein deriving the firmware image in accordance with the security policy comprises selecting an appropriate memory configuration from among memory configuration options available at a target platform.

6. The method of claim 5, wherein selecting an appropriate memory configuration comprises selecting an appropriate memory configuration from among: top of range (TOR), naturally aligned power-of-two (NAPOT), or 4-Byte (4B).

7. The method of claim 1, wherein deriving the firmware image in accordance with the security policy comprises validating that the security policy is not configured to interfere with operation of the secure monitor executable.

8. The method of claim 1, wherein deriving the firmware image in accordance with the security policy comprises configuring the first execution domain to exceed the number of registers defined in hardware of a target platform.

9. The method of claim 1, wherein deriving the firmware image in accordance with the security policy comprises assigning a first soft timer to the first execution domain and assigning a second soft timer to the second execution domain.

10. The method of claim 1, wherein deriving the firmware image comprising deriving the firmware image for a platform.

11. A method for concurrently executing a plurality of executables, comprising:
switching execution to a first execution domain where a first executable is running in a first security context limited to using flash memory in a first flash memory address range and limited to using system memory in a first system memory address range;

executing an instruction of the first executable in accordance with the first security context, including limiting the instruction to using flash memory in the first flash memory address range and to using system memory in the first system memory address range;

at a specified time interval, switching execution to a second execution domain where a second executable is running in a second security context limited to using flash memory in a second flash memory address range and limited to using system memory in a second system memory address range, the second flash memory address range distinct from and non-overlapping with the first flash memory address range, the second system memory address range distinct from and non-overlapping with the first system memory address range;

executing another instruction of the second executable in accordance with the second security context, including limiting the other instruction to using flash memory in the second flash memory address range and to using system memory in the second system memory address range;

at another specified time interval, switching execution back to the first execution domain; and executing a further instruction of the first executable in accordance with the first security context, including limiting the further instruction to using flash memory in the first flash memory address range and to using system memory in the first system memory address range.

12. The method of claim 11, further comprising switching execution from the first execution domain to a third execution domain prior to switching execution to the second domain.

13. The method of claim 11, further comprising changing a policy stored in a processor at runtime to overcome a processor limitation in the number of registers available to the first execution domain.

14. The method of claim 11, further comprising suspending the first execution domain to conserver power.

15. The method of claim 14, further comprising:
suspending the second execution domain to conserver power; and
transitioning a processor to a lower power state in response to detecting suspension of both the first execution domain and the second execution domain.

* * * * *